US006758584B2

United States Patent
Bach et al.

(10) Patent No.: US 6,758,584 B2
(45) Date of Patent: Jul. 6, 2004

(54) SLIDE LOCK FOR GRAB HANDLE ASSEMBLY

(75) Inventors: Kent Bach, Villa Park, IL (US); Peter Valentino, Downers Grove, IL (US)

(73) Assignee: Fleming Sales Company, Inc., Addison, IL (US)

( * ) Notice: Subject to any disclaimer, the term of this patent is extended or adjusted under 35 U.S.C. 154(b) by 96 days.

(21) Appl. No.: 10/272,836

(22) Filed: Oct. 17, 2002

(65) Prior Publication Data

US 2004/0076014 A1 Apr. 22, 2004

(51) Int. Cl.[7] ............................................. F21V 21/08
(52) U.S. Cl. ...................... 362/399; 362/374; 362/501; 362/576; 16/110.1; 16/444; 16/DIG. 24
(58) Field of Search ................... 16/110.1, 406, 16/410, 444, DIG. 24; 362/146, 374, 375, 399, 501, 551, 576

(56) References Cited

U.S. PATENT DOCUMENTS

| | | |
|---|---|---|
| 1,203,576 A | 11/1916 | Broadhead |
| 1,523,495 A | 1/1925 | Silberman |
| 2,151,182 A | 3/1939 | Birdsall |
| RE21,512 E | 7/1940 | Creamer |
| 2,242,981 A | 5/1941 | Pedersen |
| 2,308,844 A | 1/1943 | Wilshusen |
| 2,310,593 A | 2/1943 | Orlicki |
| 2,479,500 A | 8/1949 | Longberg |
| D216,458 S | 1/1970 | Nestrock |
| 3,569,689 A | 3/1971 | Nestrock |
| 3,707,016 A | 12/1972 | Smoot |
| 4,149,331 A | 4/1979 | Prager |
| 4,231,077 A | 10/1980 | Joyce et al. |
| 4,274,131 A | 6/1981 | Praamsma |
| 4,356,592 A | 11/1982 | Moore |
| 4,394,718 A | 7/1983 | Balzer |
| 4,413,311 A | 11/1983 | Orenstein |
| 4,878,156 A * | 10/1989 | Hallings et al. ............ 362/399 |
| 5,020,256 A | 6/1991 | French |
| 5,025,352 A | 6/1991 | Brown |
| 5,165,643 A | 11/1992 | Shreiner |
| 5,193,786 A | 3/1993 | Guenther |
| 5,288,048 A | 2/1994 | Shreiner |
| 5,297,010 A | 3/1994 | Camarota et al. |
| 5,339,228 A | 8/1994 | Baethge et al. |
| 5,396,740 A | 3/1995 | Bocchi |
| 5,440,783 A | 8/1995 | Allardyce et al. |
| 5,692,822 A | 12/1997 | Dreyer |
| 5,771,537 A | 6/1998 | Ho |
| 5,779,228 A | 7/1998 | Hansen |
| 5,913,671 A | 6/1999 | Fernandez et al. |
| 5,957,566 A | 9/1999 | Chiu |
| 6,065,852 A | 5/2000 | Crumley |
| 6,135,621 A | 10/2000 | Bach et al. |
| 6,164,805 A | 12/2000 | Hulse |
| 6,209,933 B1 | 4/2001 | Ang et al. |
| 6,290,040 B1 | 9/2001 | Chen |

FOREIGN PATENT DOCUMENTS

| | | |
|---|---|---|
| EP | 0 515 921 A2 | 12/1992 |
| GB | 1445843 | 8/1976 |
| JP | 406094922 | 4/1994 |
| JP | 11208277 | 1/1998 |

OTHER PUBLICATIONS

"Introducing IllumaGrip," ITC Incorporated Marine and RV Accessories, p. 1.

* cited by examiner

*Primary Examiner*—Stephen F. Husar
(74) *Attorney, Agent, or Firm*—Wallenstein Wagner & Rockey, Ltd.

(57) ABSTRACT

A slide lock assembly is provided. The slide lock assembly is primarily for a grab handle assembly having a mounting assembly comprising a cap with a tab and a base with an aperture for receiving the tab. However, the slide lock assembly of the present invention may be used with any mounting or similar assembly comprising a base and cap.

38 Claims, 4 Drawing Sheets

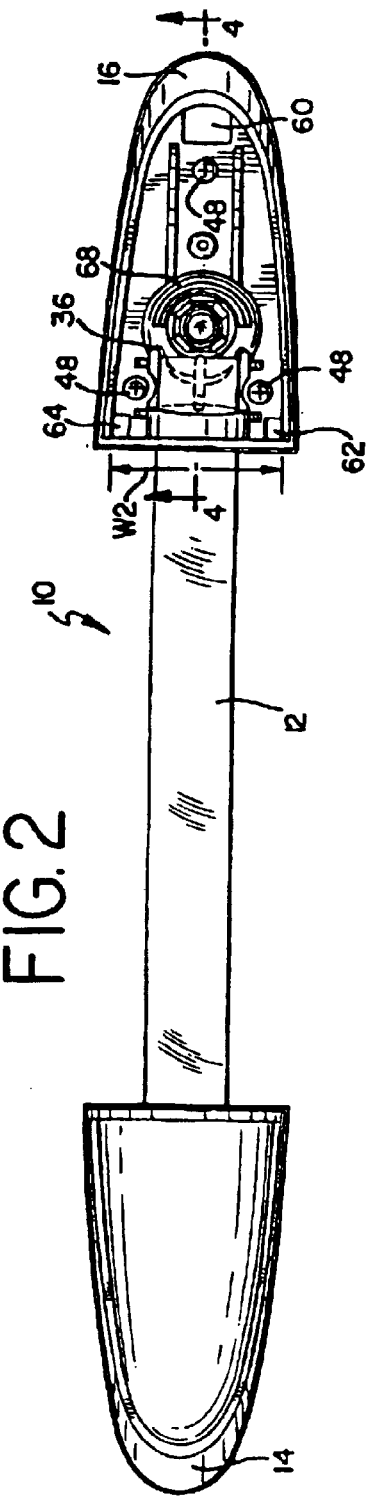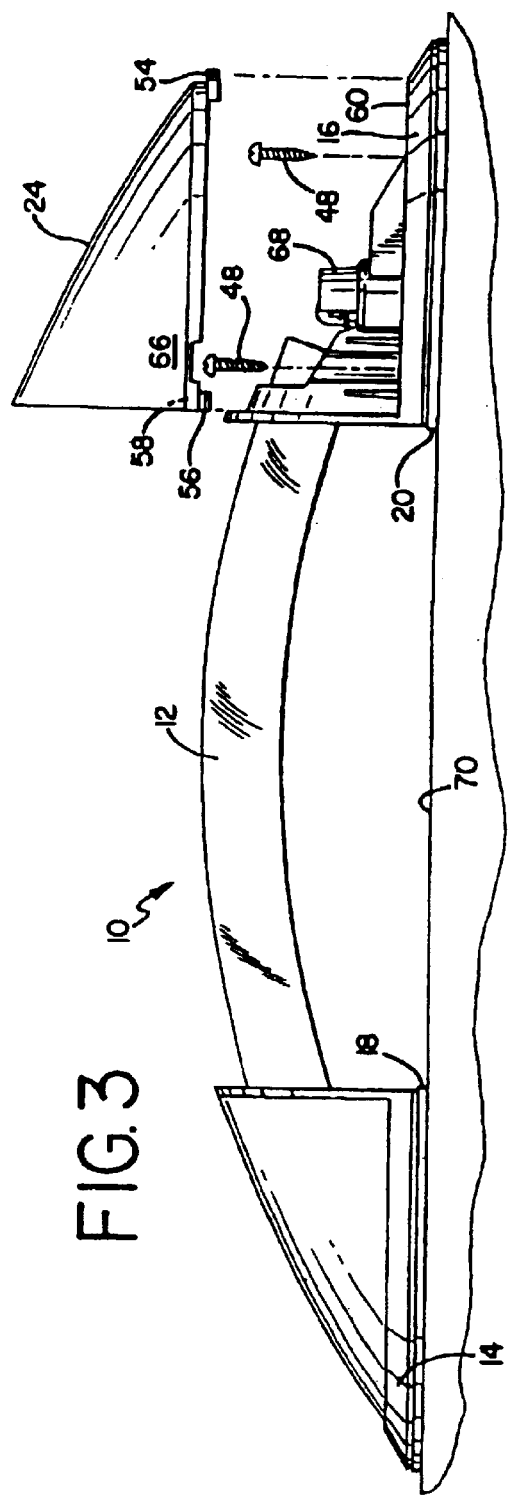

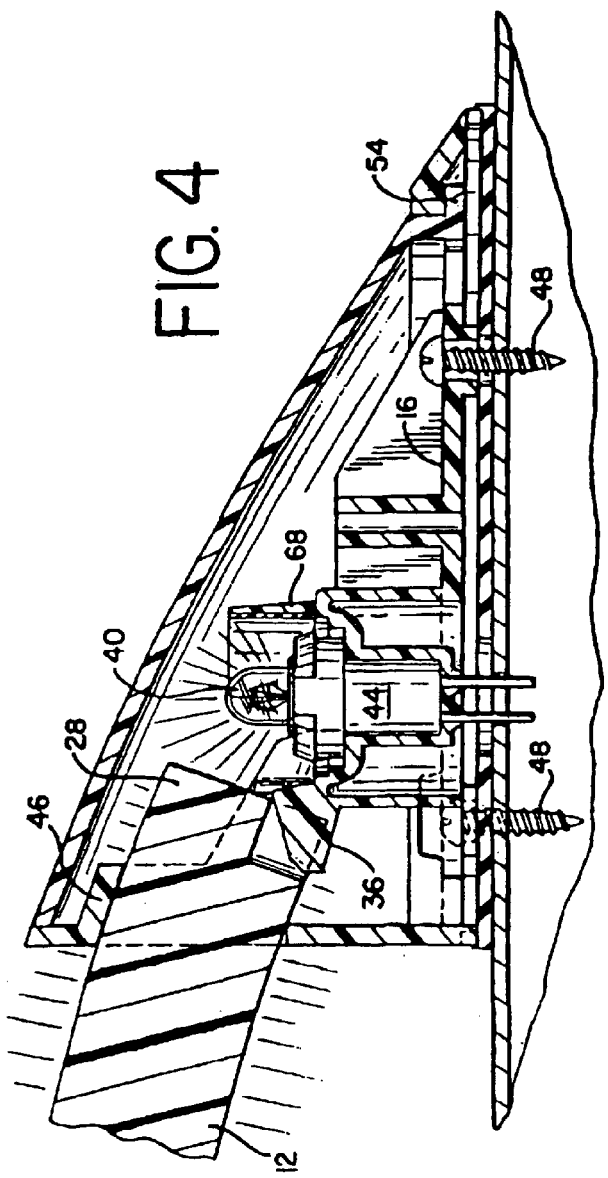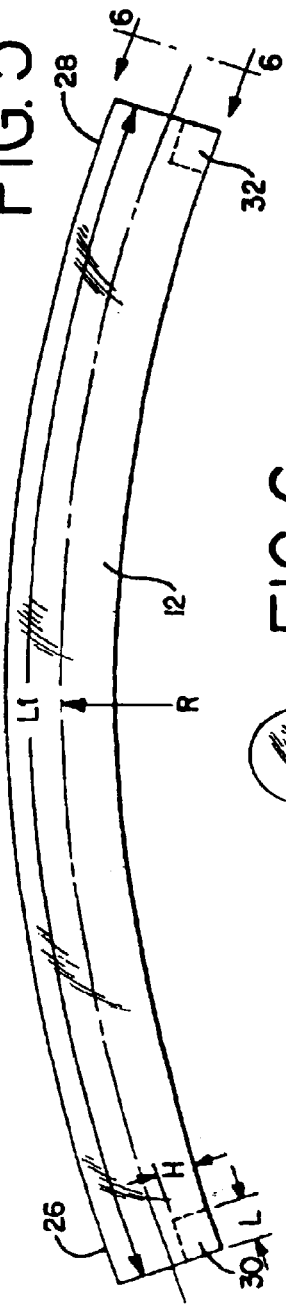

SLIDE LOCK FOR GRAB HANDLE ASSEMBLY

TECHNICAL FIELD

This invention relates generally to a grab handle assembly that may be attached to any of several surfaces. Particularly, it relates to a slide lock assembly for a grab handle assembly.

BACKGROUND OF THE INVENTION

Grab handles, illuminated and otherwise are well-known in the art. Among the illuminated handles disclosed in United States patents include U.S. Pat. No. 5,297,010 ("the '010 patent") and U.S. Pat. No. 5,025,352 ("the '352 patent"). While both of these illuminated handles are generally satisfactory for their intended purposes, they are not aesthetically pleasing because their means of connection, such as screws, are exposed when those handles are secured to a surface. For example, the '010 patent discloses a pair of screws that secure the handle to a surface. This is evidenced from column 3, lines 50–53, of the '010 patent: "(h)eads of the screws 18 are exposed through the exterior surface 10 of the member 1 for access by a tightening or loosening tool . . . " The use of the term "illuminated grab handle" to describe this invention is also somewhat misleading, in that the handle itself is apparently not illuminated. Instead, as indicated at column 3, lines 14–22, the light merely illuminates the wall behind the handle: "light from the light bulb . . . splashes on the vehicle wall W behind the grab handle 100." All that is seen is the splash of light emanating from behind the handle when the power is turned on. The splash of light extends laterally beyond the sides of the handle along the wall W. In this manner, the user can see the handle 100 at night by the light reflected from the wall W."

The '352 patent is directed to a lighted grab handle for trucks. The grab handle itself is apparently illuminated, but its mounting means, preferably screws or bolts, are highly visible when the grab handle is in use. See FIGS. 2 and 3 and column 2, lines 47–50 of the '352 patent, and see especially the visible bolts 30 in those two FIGURES.

Other generally relevant patents include U.S. Pat. Nos. 4,414,611; 5,528,468; 5,746,498; and 6,079,859 (referred to as "the '611, the '468, the '498,and the '859 patent", respectively). The '611 patent is directed to a portable light having a housing which can be mounted onto a support surface. The device in the '611 patent includes a main housing section, a removable back, and a removable upper transparent cover. The housing has a stepped construction. This device is not, however, an illuminated handle. The '468 patent is directed to an opera light for mounting upon either the "B" or "C" pillars of an automobile. The opera light of this invention is thin and flat, and thus cannot be grasped by the user to assist that user in entering or leaving a motor vehicle. Accordingly, this opera light cannot be fairly characterized as a grab handle.

Similarly, neither the '498 nor the '859 patents are directed to grab handles, but are instead directed to other kinds of automotive lamp assemblies. The '498 patent is directed to an auxiliary or third brake lamp, such as the center high mounted stop lamps (CHMSL) that have been mandated in cars sold in the United States since 1985. These CHMSLs may be installed inside of the car, such as upon the parcel shelf behind the rear seat and near the base of the rear window. Alternatively, the CHMSL may be mounted adjacent the top of the rear window, or upon the exterior surface of the car, near the trunk lid and directly in front of the rear window. The '859 patent is directed to an interior lamp assembly for an automobile, such as the assemblies used for interior roof mounted dome lights or side mounted interior reading lights.

Additionally, grab handles are known of a type the include a handle member secured to a pair of mounting assemblies. Each mounting assembly includes a base and a cap. Typically the base is mounted to a surface and the cap is press-fit mounted to the base. Tabs in the cap are received in apertures in the base. This is generally adequate. However, depending on the environment in which the grab handle is used, the cap may unintentionally become removed from the base due to thermal contraction and expansion, vibration or other environmental concerns.

The present invention is provided to solve these and other concerns.

SUMMARY OF THE INVENTION

A slide lock assembly is provided. The slide lock assembly is primarily for a grab handle assembly having a mounting assembly comprising a cap with a tab and a base with an aperture for receiving the tab. However, the slide lock assembly of the present invention may be used with any mounting or similar assembly comprising a base and cap.

The slide lock assembly includes a slide member slidingly mounted to the base. The slide member is mounted for movement between a locked position wherein the slide member interferes with the tab to maintain the tab within the aperture and an unlocked position wherein the slide member does not interfere with the tab.

In accord with one aspect of the invention, the slide lock assembly includes a biasing means for biasing the slide member to the locked position.

In accord with another aspect of the invention, the biasing means includes a spring having a first end engaging the slide member and a second end engaging the base.

In accord with another aspect of the invention, the slide member includes a spring seat for receiving the first end of the spring.

In accord with another aspect of the invention, the biasing means includes a resiliently flexible member.

In accord with another aspect of the invention, the resiliently flexible member is integral with the slide member.

In accord with another aspect of the invention, the resiliently flexible member is adapted to be integral with the base.

In accord with another aspect of the invention, the slide member further includes a pin extending from the slide member, the pin abutting the tab when the slide member is in the locked position.

In accord with another aspect of the invention, the slide member further includes a finger adapted to slide along a rail of the base as the slide member moves between the locked position and the unlocked position.

In accord with another aspect of the invention, the slide member further includes a second pin extending from the slide member for interfering with a second tab of the cap to maintain the second tab within a second aperture of the base when the slide member is in the locked position.

BRIEF DESCRIPTION OF THE INVENTION

FIG. 2 is a top view of the entire assembly of FIG. 1, but with the overcap on the right side of the assembly removed;

FIG. 3 is a side view of the assembly of FIGS. 1 and 2;

FIG. 4 is a cross-sectional, enlarged view of a portion of the right side of the assembly of FIG. 1, showing details of the base portion, and showing the assembly, with the cap in position, being illuminated by an incandescent light bulb or lamp;

FIG. 5 is a side view of the generally curved handle of FIG. 1;

FIG. 6 is an end view, taken along lines 6—6 of FIG. 5, of the generally curved handle of FIG. 5;

DETAILED DESCRIPTION

This invention is susceptible of embodiment in many different forms. The drawings show and the specification describes in detail a preferred embodiment of the invention. It will be understood that the present disclosure is to be considered as an example of the principles of the invention. The disclosure is not intended to limit the broad aspect of the invention to the illustrated and described embodiments.

Figure 1:
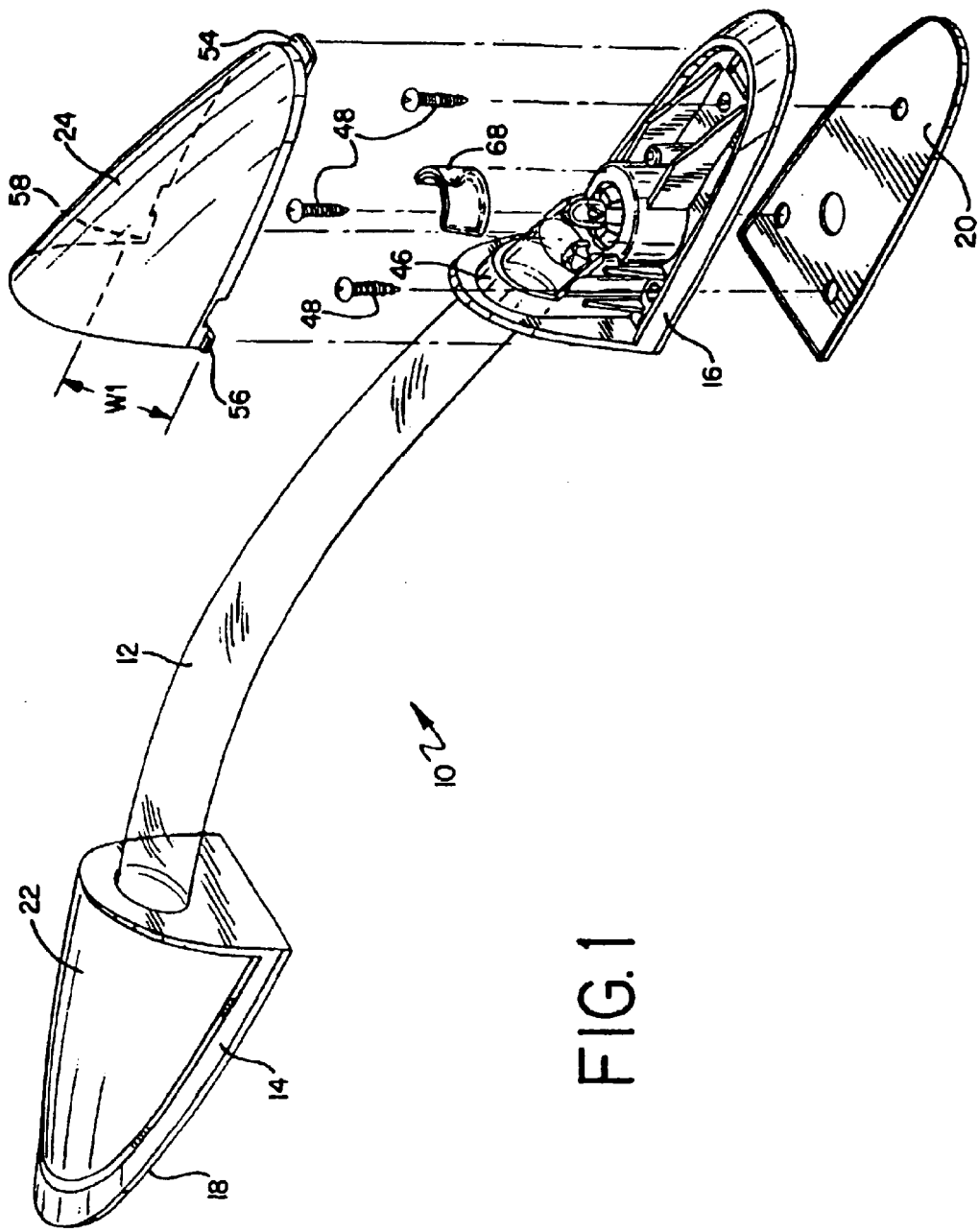
FIG. 1 is a perspective view of one preferred embodiment of the assembly of the invention, with an opaque overcap on the right side of the assembly shown in exploded view away from its base, and with the overcap on the left side of the assembly positioned to cover the base and the mounting means for the base portion.
Figure 7:
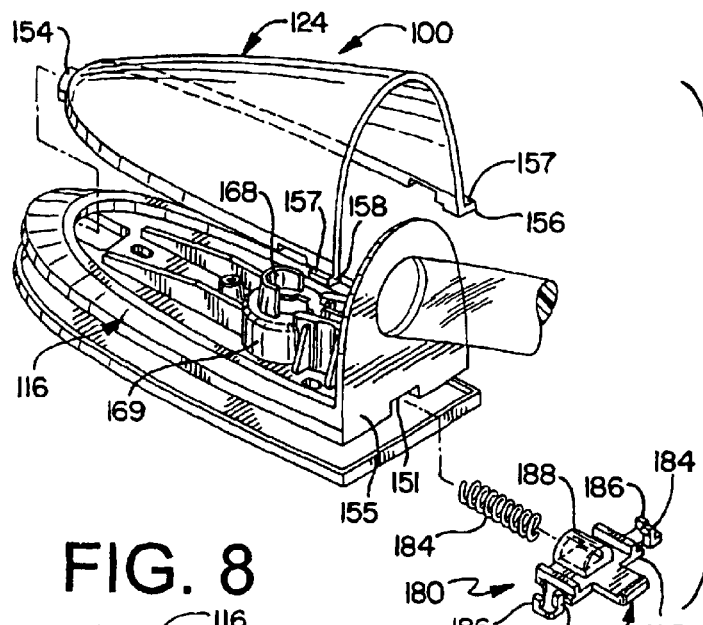
FIG. 7 is an exploded perspective view of a mounting assembly of the present invention.
Figure 8:
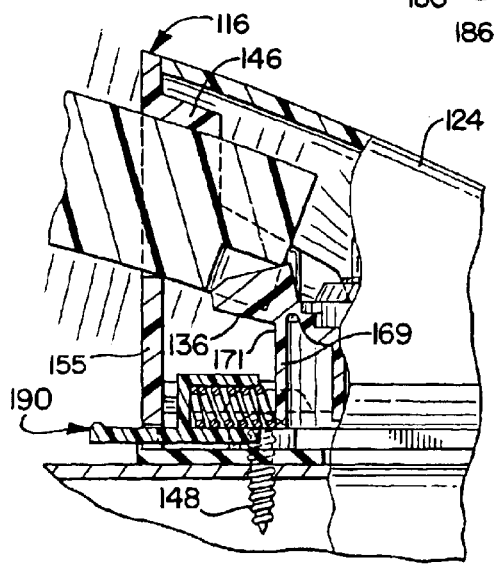
FIG. 8 is a partial cross-section of a side view of the mounting assembly of FIG. 7.
Figure 9:
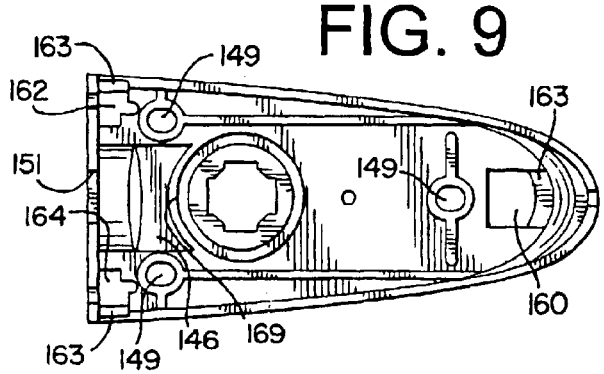
FIG. 9 is a bottom view of a base of the mounting assembly of FIG. 7.
Figure 10:
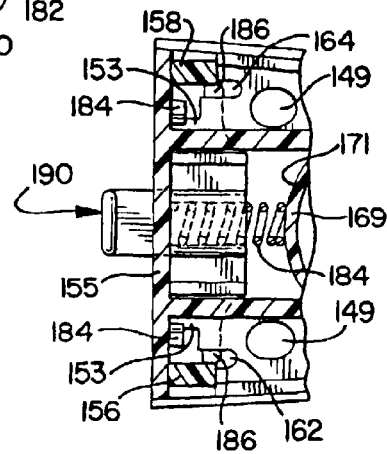
FIG. 10 is a top cross sectional view of the mounting assembly showing the slide lock assembly in its locked position.

FIG. 1 shows a perspective view of one preferred embodiment of the invention. An illuminated grab handle assembly 10 is shown. The illuminated grab handle assembly 10 shown in this FIG. 1 is simple in its construction, comprising only seven main parts, plus the fasteners to secure the assembly to a mounting surface. The seven main parts include a generally curved handle 12; a pair of mirror image base portions 14 and 16; a pair of mirror image gaskets 18 and 20 that are placed between the base portions 14 and 16 and the surface to which the handle assembly 10 is to be mounted and secured; and a pair of mirror image caps or overcaps 22 and 24 that are secured to the respective base portions 14 and 16.

Referring to FIGS. 1–4, the handle member or generally curved handle 12 is a clear, acrylic rod. It has a diameter of approximately one (1) inch, but may be of any suitable diameter or cross section. The curved handle 12 has a linear length L1, along a center line through the middle (see FIG. 5) of the handle, of approximately 11.75 inches. Of course, L1 may be of any suitable length. The radius R of curvature of this center line is approximately 17.50 inches. The radius of curvature may vary, depending upon the length of the generally curved handle 12. Instead, the handle could be substantially straight, with radiused ends. Furthermore, it is understood that the handle need not be curved at all and remain within the scope of the invention.

FIG. 4 shows a cross-sectional view of the right side of the illuminated grab handle assembly. It should be understood that the left side of the illuminated grab handle assembly is a mirror image of the structure shown in FIG. 4, and is otherwise identical.

As may best be seen in FIG. 5, the generally curved handle 12 has a pair of ends 26 and 28. The portion of the generally curved handle 12 between the pair of ends 26 and 28 is both solid, as may be seen in FIG. 6, and has a generally cylindrical cross section. As noted, the handle may have any of a variety of cross sections and remain within the scope of the invention. Alternatively, the generally curved handle 12 may be tubular, and made of an acrylic material. As may be seen in FIGS. 5 and 6, each of ends 26 and 28 of the generally curved handle 12 include a groove 30 and 32. In this embodiment, each of these grooves 30 and 32 has a height H of 0.350 inch, a length L2 of 0.375 inch, and a width W of 0.125 inches. As may best be seen in FIGS. 4 and 6, the grooves 30 and 32 are engaged with a keyway 34 (not shown) and 36 in respective base portions 14 and 16. The interfering engagement of the grooves 30 and 32 with the keyways 34 (not shown) and 36, respectively, ensures that the generally curved handle 12 is retained in a non-rotational and stable manner by the base portions 14 and 16. As the handle 12 and its grooves 30 and 32 are moved further onto the respective keyways 34 (not shown) and 36, additional interference creates a tighter fit between the handle 12 and the base portions 14 and 16. In addition, the movement of the grooves at the end of the handle 12 onto the keyways 34 (not shown) and 36 results in a tighter engagement between the top of the handle 12 and the bottom of the top of the sleeve 46, as can best be seen at the top of FIG. 4. This tighter engagement between the handle and the sleeve 46 also helps to inhibit rotation of the handle 12. An illumination source is positioned remotely from the generally curved handle 12. This illumination source projects light through the handle 12. As depicted by projecting lines in FIG. 4, the illumination source provides the generally curved handle 12 itself with a substantially uniform, fully illuminated appearance. In other words, the illumination source provides the curved handle 12 with the appearance of a solid bar of light. This contrasts with at least one of the illuminated grab handles of the prior art, as described above, which projects light onto a wall behind the handle.

Preferably, the light is directed towards the handle 12, in order to prevent the unwanted dispersion of light away from that handle 12. Unwanted dispersion of light away from the handle 12 results in a less brightly illuminated handle 12. In order to concentrate the light towards the handle 12, a reflector 68 is provided. This reflector 68 is made of a fire retardant polypropylene having a white matte finish. The reflector 68 has an adhesive backing, permitting the reflector 68 to be adhered to the socket base that surrounds the bulb 40 and its holder. The use of this reflector 68 increases the light intensity in the handle 12 by an estimated 35%, as compared to an apparatus without the reflector 68. In FIG. 1, this reflector 68 is shown exploded upwardly away from the socket base that surrounds the bulb 40 and its holder.

While the assembly 10 must have at least one base portion, as noted above, the present embodiment includes two base portions 14 and 16. These two base portions 14 and 16 accommodate the two illumination sources, here two incandescent lamps 38 or LEDs (not shown) and 40, and a pair of conventional bulb or lamp sockets 42 (not shown) and 44. The bulbs 38 and 40 may be powered by either alternating current, direct current, through a hard-wired circuit, or by battery power. It is also understood that the invention may include, as an illumination source, one or more light-emitting diodes (LEDs).

As may be seen in FIG. 4, end 28 of generally curved handle 12 is secured to base portion 16. As shown in FIG. 1, a sleeve 46 is part of the molded base portion 16. The sleeve 46 has an inner diameter that is slightly larger than the one (1) inch diameter of the generally curved handle 12 and its end 28. The end 28 slides into the sleeve 46 and, as noted above, has a groove 32 that interlocks with the keyway 36.

Mounting means are provided for securing the base portions 14 and 16 to a mounting surface 50. Preferably, the mounting means comprises one or more sets of screws 48.

Opaque colored or translucent overcaps 22 and 24 cover the base portions 14 and 16. These overcaps 22 and 24 obscure the screws 48 or any other mounting means that secure the base portions 14 and 16 to the mounting surface. These overcaps 22 and 24 are preferably made of a grey acrylobutyl styrene (ABS). These unfinished ABS overcaps 22 and 24 may be plated or vacuum metallized with a thin chromium or gold plating.

As may best be seen in FIGS. 2, 3 and 4, overcap 24 includes at least one tab. In this embodiment, the overcap 24 includes three tabs 54, 56, and 58. The front tab 54 is secured to a corresponding orifice 60 at the tip of the base portion 16. The two side tabs 56 and 58 (not shown) become secured to orifices 62 and 64 at the sides of the base portion 16.

The overcap 24 has a bottom portion 66, and the width W1 of the bottom portion 66 (depicted in FIG. 1), including the tabs, of the overcap 24 is wider than the width W2 (FIG. 2) of the base portion 16. As a result of this construction, the overcap 24 may be press fit or snap fit onto the base portion 16. Particularly, in order to place the overcap 24 onto the base portion 16, the user grips the bottom portion 66 of the overcap 24 directly above tabs 56 and 58, respectively. The overcap 24 is squeezed inwardly to effectively compress and thereby reduce the width W1 of the back end of the overcap 24. The front tab 54 is then angled into engagement with its corresponding orifice 60. While maintaining squeezing pressure upon the back end of the overcap 24, tabs 56 and 58 are lowered towards their corresponding orifices 62 and 64. When the tabs 56 and 58 are positioned adjacent the orifices 62 and 64, the pressure imposed upon the overcap 24 by the thumb and forefinger is released. The tabs 56 and 58 then spring into a locking engagement with orifices 62 and 64. Removal of the overcap 24 from the base portion 16 is the reverse of installation.

The overcap 24 may be removed to gain access to and permit replacement of the incandescent lamp or LED 40. If the bulbs 38 and 40 are powered by batteries rather than direct or alternating current, these batteries may be placed below the overcap 24. Access to the batteries is obtained by removal of the overcap 24.

The bases or base portions 14, 16 and cap or overcaps 22–24 together comprise a mounting assembly. FIGS. 7–11 disclose an alternative preferred embodiment of a mounting assembly 100 for an illuminated grab handle assembly 10. It is noted that the mounting assembly 100 of the present invention may be utilized with other than illuminated grab handle assemblies while remaining within the scope of the below claims.

The mounting assembly 100 is comprised of a base or base portion 116, a cap or overcap 124, and a slide lock assembly 180.

The base 116 is nearly identical to the base 16 disclosed and described above. Accordingly, features of the base 116 that are similar to described features of the base 16, are referred to by the same number, plus 100. Where differences exist, such differences are noted. Accordingly, the base 116 includes a keyway 136, a sleeve 146 and a reflector 168, similar in form and function to those described above. The base 116 also includes a socket base 169 adapted for mounting an illumination source such as the incandescent lamp 40 described above. However, it is noted again that use of an illumination source is not required. The base 116 also includes mounting means comprising screws 148 and screw holes 149. Other mounting means may be utilized such as rivets or other connectors. Additionally, any appropriate adhesive may also be utilized. Similar to the base 16, the base 116 includes front or fore orifice or aperture 160 and side orifices or apertures 162 & 164. Each aperture 162, 164 defines an aperture-locking surface 163.

The base 116 further includes a button slot 151 and a pair of rails 153. The button slot 151 is located on and extending through a front face 155 of the base 116. Each rail 153 is proximal to and defines in part a respective side aperture 162, 164.

The cap 124 of the embodiment depicted in FIGS. 7–11 is identical in all respects to the cap depicted in FIG. 1–6 and described above. Accordingly, the cap 124 includes a front tab 154 and a pair of side tabs 156 & 158. The cap 124 also has a width W1 including side tabs 156 & 158. Additionally, each tab 156, 158 defines a tab-locking surface 157.

The slide lock assembly 180 includes a slide member 182 and a spring 184. The slide member 182 includes a pair fingers 184, a pair of protrusions or pins 186, a spring seat 188 and an actuator or button 190. The slide member 182 is generally flat. A single finger 184 extends from the slide member 182 at each of opposed sides of the slide member 182. A single pin 186 extends from the slide member 182 at each of opposed sides of the slide member 182.

The button 190 and seat 188 are generally opposed to one another. The seat 188 is a generally cylindrical receptacle. The spring 184 mounts to the slide member 182 by insertion of the spring 184 into the seat 188. The seat may take other forms, such as a spring post (not shown) about which a spring 184 may be mounted. The spring 184 depicted in FIGS. 7–11 is a generally helical compression spring. Of course, other biasing means may be used including leaf springs, torsional springs, or any resiliently flexible member. A resiliently flexible member integral to either the slide member 182 or the base 116 may be used.

The slide member 182 is slidingly mounted to the base 116 such that the fingers 184 are disposed within a respective side aperture 162, 164 to engage and slide along a respective rail 153. When assembled, the pins 186 are disposed within respective side apertures 162, 164. The spring 184 is received at one end by the seat 188. Another end of the spring 184 abuts against an exterior surface 171 of the socket base 169.

Figure 11:
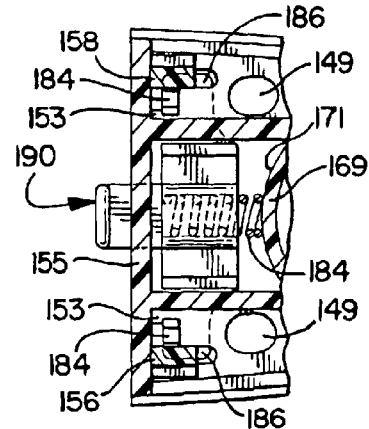
FIG. 11 is a top cross sectional view of the mounting assembly showing the slide lock assembly in its unlocked position.

Assembly of the cap 124 to the base 116 is very similar to that described above with respect to cap 24 and base 16. The front tab 154 of the cap 124 is angled and inserted into the fore aperture 160. The portions of the cap 124 just above each side tab 156 & 158 are compressed as the side tabs 156 & 158 are moved towards their respective side apertures 162 & 164. As the tabs 156 & 157 are inserted into apertures 162 & 164, the button 190 is depressed. Depressing the button 190 moves the pins 186 from the locked position shown in FIG. 10 to an unlocked position, as shown in FIG. 11. Once the tabs 156, 158 are fully within respective apertures 162, 164, the cap 124 is released by the user causing the tabs 156, 158 to move laterally to a fully installed position. That is, the tab locking surfaces 157 are in interfering relation to the aperture locking surfaces 163. The button 190 is then released wherein the spring 184 slides the slide member 182 to the locked position. It can be seen that in the locked position, the pins 186 are immediately adjacent the tabs 156, 158. In this position, the pins 186 prevent the tabs 156, 158 from compressing or moving in a direction wherein the tab locking surfaces 157 will disengage the aperture locking surfaces 163. The pins 186 thus maintain the tabs 156, 158 within their respective apertures 162, 164. This effectively locks or secures the cap 124 to the base 116 against any unintended or otherwise accidental separation of the cap 124 from the base 116.

To remove the cap 124 from the base 116, the opposite procedure is used. The button 190 is depressed thus disengaging the pins 186 from their respective tabs 156, 158. The cap 124 is then compressed, thereby causing the tab locking surfaces 157 to disengage respective apertures locking surfaces 163 The cap 124 may then be lifted away from the base 116.

It should be noted that no spring or other biasing means need be utilized to remain within the scope of the invention. In an embodiment lacking the biasing means, the slide member 182 and base 116 may be adapted to hold the slide member 182 in the locked position. For instance, the rail or rails 153, may include a bump positioned to interfere with the finger(s) 184 to releasably hold the slide member 182 in the locked position.

Specific embodiments have been illustrated and described. Numerous modifications are possible, without significantly departing from the spirit of the invention. Therefore, the scope of protection is only limited by the scope of the accompanying claims.

We claim:

1. A grab handle assembly for mounting to a surface, the grab handle assembly comprising:
    a handle member;
    a cap comprising a tab;
    a base to which an end of the handle member is secured, the base adapted to be secured to the surface, and comprising an aperture for receiving the tab; and
    a slide lock assembly comprising:
        a slide member slidingly mounted to the base for movement between a locked position and an unlocked position;
    wherein, in the locked position the slide member interferes with the tab to maintain the tab within the aperture and in the unlocked position, the slide member does not interfere with the tab.

2. The grab handle assembly of claim 1 wherein the slide lock assembly further comprises biasing means for biasing the slide member to the locked position.

3. The grab handle assembly of claim 2 wherein the biasing means comprises a spring having a first end engaging the slide member and a second end engaging the base.

4. The grab handle assembly claim 3 wherein the slide member further comprises a spring seat for receiving the first end of the spring.

5. The grab handle assembly of claim 2 wherein the biasing means comprises a resiliently flexible member.

6. The grab handle assembly of claim 5 wherein the resiliently flexible member is integral to the slide member.

7. The grab handle assembly of claim 5 wherein the resiliently flexible member is integral to the base.

8. The grab handle assembly of claim 1 wherein a pin extends from the slide member, the pin abutting the tab when the slide member is in the locked position.

9. The grab handle assembly of claim 1 wherein the slide member further comprises a finger and the base further comprises a rail, wherein the finger slides along the rail as the slide member moves between the locked and unlocked positions.

10. The grab handle assembly of claim 1 further comprising an illumination source positioned remotely from the end of the handle member for illuminating the handle member.

11. The grab handle assembly of claim 10 wherein the illumination source provides the handle with a substantially uniform, fully illuminated appearance.

12. The grab handle assembly of claim 1 further comprising:
    a keyway in said base; and
    a groove in the handle member proximal to the end of the handle member for receiving said keyway.

13. The grab handle assembly of claim 1 wherein the handle member is solid.

14. The grab handle assembly of claim 13 wherein the handle member has a generally circular cross section.

15. The grab handle assembly of claim 10 further comprising a reflector mounted to one of either the cap or the base for reflecting light from the illumination source primarily towards said handle member.

16. The grab handle assembly of claim 1 wherein the tab is located on a bottom of the cap and extends generally outwardly from the cap.

17. The grab handle assembly of claim 1 wherein the cap further comprises a second tab and the base further comprises a second aperture for receiving the second tab.

18. The grab handle assembly of claim 17 wherein the slide member comprises a first pin extending from the slide member and a second pin extending from the slide member, the first pin abutting the first tab and the second pin abutting the second tab when the slide member is in the locked position.

19. The grab handle assembly of claim 1 further comprising:
    a second cap comprising a tab;
    a second base to which a second end of the handle member is secured, the second base adapted to be secured to the surface and comprising an aperture for receiving the tab of the second cap; and
    a second slide member slidingly mounted to the base for movement between a locked position wherein the slide member interferes with the tab to maintain the tab within the aperture and an unlocked position wherein the slide member does not interfere with the tab.

20. A slide lock assembly for a grab handle assembly having a cap with a tab and a base with an aperture for receiving the tab, the slide lock assembly comprising:
    a slide member slidingly mounted to the base for movement between a locked position wherein the slide member interferes with the tab to maintain the tab within the aperture and an unlocked position wherein the slide member does not interfere with the tab.

21. The slide lock assembly of claim 20 further comprising biasing means for biasing the slide member to the locked position.

22. The slide lock assembly of claim 21 wherein the biasing means comprises a spring having a first end engaging the slide member and a second end engaging the base.

23. The slide lock assembly of claim 22 wherein the slide member comprises a spring seat for receiving the first end of the spring.

24. The slide lock assembly of claim 20 wherein the biasing means comprises a resiliently flexible member.

25. The slide lock assembly of claim 24 wherein the resiliently flexible member is integral with the slide member.

26. The slide lock assembly of claim 24 wherein the resiliently flexible member is adapted to be integral with the base.

27. The slide lock assembly of claim 20 wherein the slide member further comprises a pin extending from the slide member, the pin abutting the tab when the slide member is in the locked position.

28. The slide lock assembly of claim 20 wherein the slide member further comprises a finger adapted to slide along a rail of the base as the slide member moves between the locked position and the unlocked position.

29. The slide lock assembly of claim 20 wherein the slide member further comprises a second pin extending from the slide member for interfering with a second tab of the cap to maintain the second tab within a second aperture of the base when the slide member is the locked position.

30. A grab handle assembly for mounting to a surface, the grab handle assembly comprising:

a handle member having an end;

a cap comprising a pair of generally opposed outwardly extending tabs located on a bottom portion of the cap;

a base to which the end of the handle member is secured, the base adapted to be secured to the surface and comprising a pair of apertures, each aperture for receiving a respective tab, the base further comprising a pair of rails;

a slide member slidingly mounted to the base, the slide member having a pair of pins extending from the slide member, each pin abutting a respective tab when the slide member is in the locked position, and having a pair of fingers wherein each finger slides along a respective rail as the slide member moves between the locked position and the unlocked position, and biasing means for biasing the slide member to the locked position.

31. The grab handle assembly of claim 30 wherein the biasing means comprises a spring having a first end engaging the slide member and a second end engaging the base.

32. The grab handle assembly claim 31 wherein the slide member further comprises a spring seat for receiving the first end of the spring.

33. The grab handle assembly of claim 30 wherein the biasing means comprises a resiliently flexible member.

34. The grab handle assembly of claim 33 wherein the resiliently flexible member is integral to the slide member.

35. The grab handle assembly of claim 33 wherein the resiliently flexible member is integral to the base.

36. The grab handle assembly of claim 30 further comprising an illumination source positioned remotely from the end of the handle member for illuminating the handle member.

37. The grab handle assembly of claim 36 wherein the illumination source provides the handle with a substantially uniform, fully illuminated appearance.

38. The grab handle assembly of claim 30 further comprising:

a keyway in said base; and a groove in the handle member proximal to the end of the handle member for receiving said keyway.

* * * * *